(12) United States Patent
Diloreto et al.

(10) Patent No.: US 6,401,387 B1
(45) Date of Patent: *Jun. 11, 2002

(54) MULTIPLE CELLULAR CONFINEMENT ASSEMBLY FOR PLANT PROPAGATION

(75) Inventors: Rinaldo J. Diloreto; Michael D. Shipley, both of Chester, VA (US); Jerry C. Murphy, Indian Trail, NC (US); Ronald A. Hunter, Finksburg, MD (US)

(73) Assignee: Atlantic Construction Fabrics, Inc., Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/645,506

(22) Filed: Aug. 25, 2000

Related U.S. Application Data

(63) Continuation-in-part of application No. 09/276,150, filed on Mar. 25, 1999, now Pat. No. 6,205,709.

(51) Int. Cl.[7] ................................................. A01G 9/02
(52) U.S. Cl. ............................ 47/66.6; 47/66.5; 47/86
(58) Field of Search .............................. 47/66.6, 66.5, 47/66.3, 65.5, 86, 59

(56) References Cited

U.S. PATENT DOCUMENTS

| | | |
|---|---|---|
| 3,676,953 A | 7/1972 | Delogne |
| 3,913,758 A | 10/1975 | Faircloth et al. |
| 4,041,641 A | 8/1977 | Dietz |
| 4,122,781 A | 10/1978 | Potter |
| 4,213,274 A | 7/1980 | Skaife |
| 4,276,720 A | 7/1981 | Lyon |
| 4,395,846 A | 8/1983 | Gjertz et al. |
| 4,453,344 A | 6/1984 | Van Wingerden |
| 4,578,899 A | 4/1986 | Katila et al. |
| 4,713,909 A | 12/1987 | Roper et al. |
| RE32,808 E | 12/1988 | Wingerden |
| 4,794,727 A | 1/1989 | Smith |
| 4,850,134 A | 7/1989 | Snekkenes |
| 4,878,313 A | 11/1989 | Polesel |
| 5,117,581 A | 6/1992 | Green et al. |
| 5,213,857 A | 5/1993 | Erkkila |
| 5,292,571 A | 3/1994 | Quinn |
| 5,430,973 A | 7/1995 | Luo |
| 5,445,396 A | 8/1995 | Sebor |
| 5,454,625 A * | 10/1995 | Christensen et al. .......... 298/18 |
| 5,589,240 A | 12/1996 | Hunter |
| 5,875,904 A | 3/1999 | Vorstenbosch |
| 6,016,628 A | 1/2000 | Schlosser |
| 6,095,156 A * | 8/2000 | Smith, II ..................... 132/286 |
| 6,205,709 B1 * | 3/2001 | Diloreto et al. .............. 47/66.6 |

FOREIGN PATENT DOCUMENTS

| | | |
|---|---|---|
| DE | 2 344 935 | 9/1973 |
| FR | 2 570 574 | 3/1986 |
| FR | 2757 828 | 7/1998 |
| JP | 10-286157 | 10/1998 |

* cited by examiner

Primary Examiner—Peter M. Poon
Assistant Examiner—Jeffrey L. Gellner

(57) ABSTRACT

A cellular container assembly comprises collapsible linked two-layer, open-ended structure containers formed of opposed container walls. The containers are formed by weldment at opposed contacting wall portions to form multiple cells for retention of a soil mix and an associated plant. The assembly also comprises a soil drain board upon which the containers are supported. The drain board defines a fluid permeable mat having pylons and a foraminous screen resting upon the mat. The drain board is mounted in a watertight box to confine the containers and drainage board. A drain in the box recycles fluid or permits runoff.

8 Claims, 4 Drawing Sheets

MULTIPLE CELLULAR CONFINEMENT ASSEMBLY FOR PLANT PROPAGATION

This application is a continuation-in-part of U.S. application Ser. No. 09/276,150, filed Mar. 25, 1999 now U.S. Pat. No. 6,205,709.

BACKGROUND OF THE INVENTION

This invention relates to cellular plant growing assemblies, and specifically to on-ground and portable assemblies.

The present invention provides a botanical assembly having a plurality of multiple soil mix compartments, wherein the compartments may be retained within a box, the compartments being supported by a drain board and an impermeable liner, the liner being supported and encased by the box. An appropriate drain for recycling water and nutrients from the multiple cellular layer and its combination is provided herein.

The Original CELLUGRO™ System

The original CELLUGRO system is detailed in U.S. Pat. No. 5,589,240, issued Dec. 31, 1996. That assemblage consists of an in-ground assembly container for plant propagation, formed of plastic strips joined together to form, when compressed, a honeycomb configuration of container cells. Each cell is used to grow individual types of trees or plants. Walls of the cells are respectively embossed to enhance containment of potting soil. By combining the honeycomb container cells with a pervious mat and an impervious supporting liner, applied nutrients and water will not escape into the ground soil except by controlled pipe drainage. This combination will thus allow for total water and nutrient recirculation back through the system or drainage. The outlay includes a PVC liner or other impervious material, an optional drainage layer and weed control fabric.

OTHER PRIOR ART

| INVENTOR | DATE | U.S. Pat. No. | DESCRIPTION |
| --- | --- | --- | --- |
| Dietz | Aug., 1977 | 4,041,641 | Growing Plants within an Enclosure |
| Skaife | July 1980 | 4,213,274 | Organic Growing Medium |
| Gjertz et al. | Aug., 1983 | 4,395,846 | Organic Growing Medium |
| Van Wingerden | June 1984 | 4,453,344 | Seedling Propagating Container |
| Katila et al. | April 1986 | 4,578,899 | Set of Growing Cells for Growing Plants |
| Wingerden | Dec., 1988 | Re. 32,808 | Plant Propagating Container and Method |
| Erkkilä | May 1993 | 5,213,857 | Cell-Structure Plant Growing Container |

SUMMARY OF THE INVENTION

The present invention is directed to novel improvements on the in-ground CELLUGRO system. The present invention is directed to portable and on-ground assemblies.

In one embodiment, the present invention is a portable cellular container assembly for plant propagation. The assembly comprises collapsible linked two-layer, open-ended structure containers formed of opposed container walls. The containers are formed by weldment at opposed contacting wall portions to form multiple cells for retention of a soil mix and an associated plant. The assembly also comprises a soil drain board, upon which the containers are supported. The drain board defines a fluid permeable mat having pylons and a foraminous screen resting upon the mat. An impermeable liner rests within a box with the liner being interposed between the box and the drainage board to confine the containers and drainage board. A drain in the liner recycles fluid runoff. Finally, the assembly comprises a cart made up of the box and a frame for supporting the box and a wheel attached to the frame and adapted to carry the weight of the assembly. The box may be rectangular in shape, and the frame may be comprised of four legs that are each attached on one end to one of the four corners of the box and on their other end to a wheel.

In a further embodiment, the assembly is an on-ground assembly. This on-ground assembly comprises collapsible linked two-layer open-ended structure containers formed of opposed container walls, the containers being bonded by weldment at opposed contacting wall portions to form multiple cells for retention of a soil mix and an associated plant. The on-ground assembly further comprises a drain board, upon which the containers are supported, said drain board defining a fluid permeable mat having pylons and a foraminous screen resting upon the mat. Finally, an impermeable liner rests within a box, the liner being interposed between the box and the drainage board to confine the containers and drainage board.

The objectives of invention include the following: to enhance the growth of more product in a greatly reduced area, wherein one requires: minimum labor to install; minimum labor to plant; minimum labor to maintain; and minimum labor to grow. Likewise, there are fewer watering times required; water may be recycled, there is no wasted water; one eliminates water runoff that could contaminate a neighboring water source; and a larger, healthier product is grown quicker and easier. Moreover, these objectives are reached: stronger root systems obtained within the assemblage; there develop minimum circling roots; and a better looking product is propagated. Even when the assembly is exposed to extreme temperature changes, plants remain at the same or higher root zone temperature because of the insulation effect of cells.

DESCRIPTION OF PREFERRED EMBODIMENTS

Figure 1:
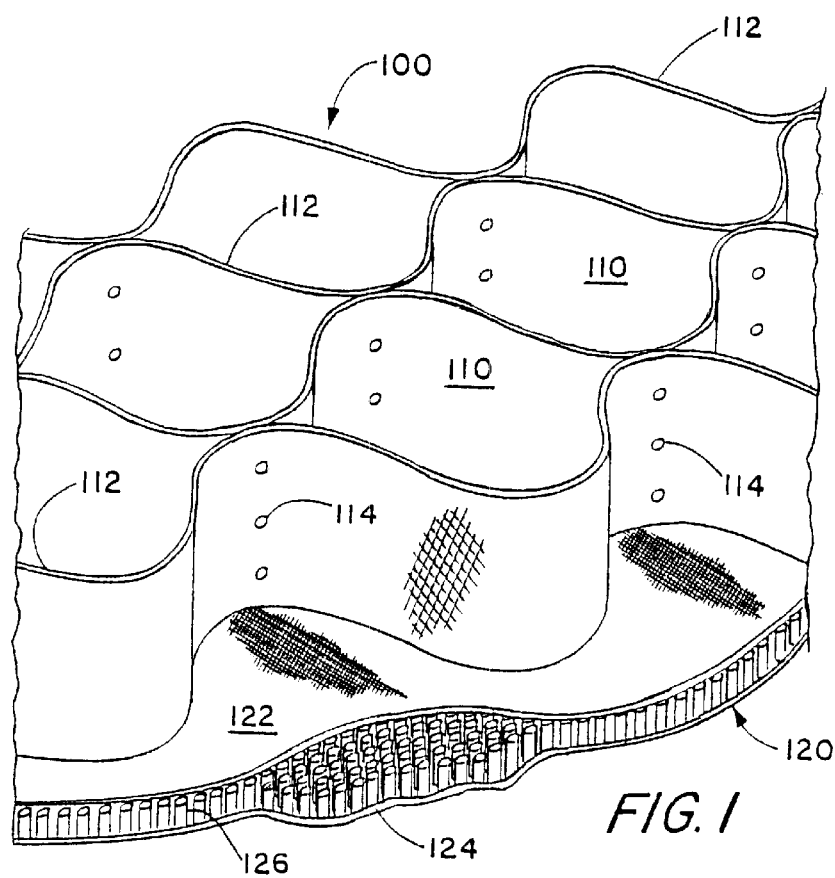
FIG. 1 is an enlarged perspective view of the combination of cellular confinement system and associated drain board.

The present on-ground cellular container assembly for propagation of plants 100, includes five basic components, namely: a box 150 having sideboards 151; honeycomb configured soil mix containers 110 that are confined within the box; a drainage board 120 beneath the containers 110, the board being known in the trade as an AMERDRAIN™ type 650, a replacement for aggregate drains or graded filters; a PVC liner 130 or other impervious material upon which the components 110, 120 are supported; and drains 141, set within the liner 130 whereby water and fluid nutrients may be drained or recycled.

CELLUGRO and AMERDRAIN are proprietary trademarks.

Figure 2:
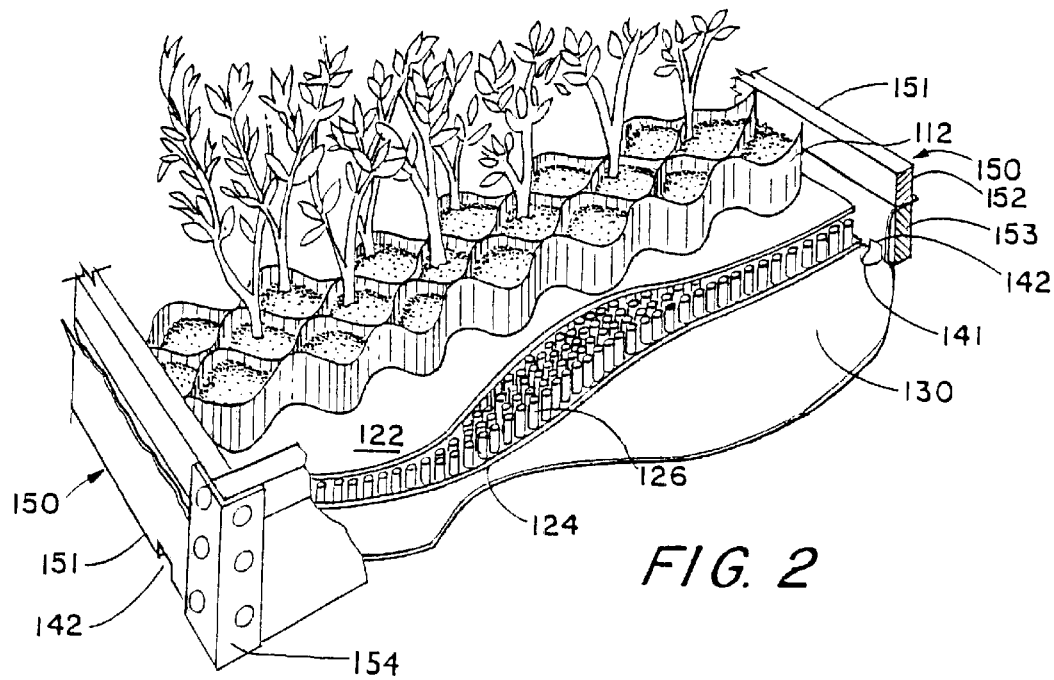
FIG. 2 is a perspective view in partial section of the on-ground assembly in accordance with the invention.

Referring to FIGS. 1 and 2, the confinement of planting soil and generative nutrients is effected by a cellular confinement structure 110, known in the trade as CELLU-GRO™. The CELLUGRO structure is placed inside the sideboards of the box 150. As shown in FIG. 1, opposed cellular soil container walls 112 are formed of semi-rigid polyethylene sheets, such that upon compression transversely, they define open-ended looplike containers 110, also referred to as cells, with sustaining weldments 114 binding the cells together. The cells 110 may optionally be further subdivided with additional panels or walls (not shown) that may be removably inserted between the opposed container walls 112, for instance, dividing the cell into halves or quarters. The unit is adapted to be positioned on-ground, providing a healthy habitat for plant growth as individual cells may be filled with an infill of soil mix and plant. For example, different soil types and different watering frequencies may apply to each of the different cells to allow for different plant habitats for different plants as desired. Protrusions 118 and indentations 118 (FIG. 5) are applied to the sheets, such that the textured finish has diamondback surface cladding molded as protrusions into at least one surface of respective cell walls 112. A negative finish of indentations 118 on the opposed face of each wall 112 is embossed. Its negative pattern and location are the same as the positive diamondback pattern. This unique diamondback pattern significantly increases the frictional interlock between the surface of the cell and infill material, enhancing performance for propagation herein. These opposed sheets forming cell walls 112 may be collapsed into compact lightweight flat bundles for each shipment, before and after compression. Additionally, the volute shape of the cells 110 is beneficial to the root growth of plants contained therein, because the distinctive shape inhibits the common phenomenon of root circling and entanglement. Also, the roots tend to grow more uniformly in the volute-shaped cells.

Drain board 120 is actually a soil drainage/filtration unit, known in the trade as AMERDRAIN™, a replacement for aggregate drains of a Type 650. It consists of a flexible, fluid-permeable, weed-control fabric 122 which is placed onto a substrate of spaced-apart pylon base 124, the combination also being known in the trade as a soil drainage mat. Its function is to support the infill of the soil mix together with CELLUGRO™ structure containers 110 while simultaneously permitting a normal runoff of applied water and fluid nutrients, leaving the infill intact. Whereas the screen 122 is readily deformable between supporting pylons 126 of mat 124, the mat, per se is not, whereby the mat retains its original configuration, supportive of the load of the honeycomb structure containers 110 above and the ground and/or box supported liner 130. While not shown, the mat 124 is fluid permeable, permitting the flow of excess fluids onto liner 130. Obviously, other types of drain boards having a support layer and foraminous screen functionally similar to drain board 120 and screen 122 will be known to those of skill in the art.

In one particular alternative, a drain board is made of an impermeable mat that supports a screen. The impermeable and three dimensional mat would also have pylons (or any type of node or protuberance), but it would be made of solid material. When an impermeable mat is used, it may be unnecessary to also have an impermeable liner. The excess fluids that pass through the cells are merely carried to the edge of the mat. In the case of an on-ground assembly, the excess fluids merely flow out the sides of the box. A drain may be incorporated into the mat, but it would then require an incline or funneling of excess fluids to the drain or fluid outlet. Those of ordinary skill in the art will create many combinations of permeable mat/impermeable liner, impermeable mat/impermeable liner, and impermeable mat structures with or without one or more drains. Corresponding drain holes 142 in the sidewalls 150 allow the excess fluids to drain out of the box.

PVC liner 130 is in sheet form, the same being sized to fit a proposed substrate cavity. This liner confines the container system on at least three sides thereof. Thus, as shown in FIG. 2, the assemblage 100 rests within a box 150; the top of each structure container 110 being approximately at the level of the top of the sideboards 151 and the bottom and sides of liner 130 resting on the ground and up the sideboards. Set within liner 130 are drains 141 to allow fluid enough.

The box 150 in a preferred embodiment of the on-ground assembly is made up of four sideboards 151. In this preferred embodiment, the box 150 does not have a bottom, rather, the sideboards 151 and the liner rest on top of the ground, asphalt, or whatever surface is available. If desired, or if the surface on which the box will be placed is uneven or otherwise requires, a bottom having the square, rectangular or other shape of the box may be used to support the liner and be connected to the bottom of the sideboards. As shown in FIG. 2, the box is rectangular in shape. Each of the four sideboards 151 is made up of a bottom piece 153 and top piece 152. Further, there are corner brackets 154 that serve to anchor the ends of the adjacent sideboards to other. The liner 130 covers the area in between the sideboards 151 and extends up the sideboards to the top of the bottom piece 153 of each sideboard. The liner 130 is then clamped between the bottom piece and top piece so that it is solidly anchored there between when the pieces are bolted to the corner brackets as shown. Alternatively, as demonstrated in FIG. 4, the sidewalls 211 may be of a single piece construction connected at the corners by screws and glue (not shown). The liner 230 is simply tacked or stapled to the sidewalls 211.

As noted earlier, the box shown is rectangular in shape. Other shapes may be desired depending on the landscaping or the available space onto which the on-ground assembly will be mounted. Obviously, an assembly or assemblies may be expanded or nested with other assemblies depending on the space available or the preference of a user.

Figure 3:
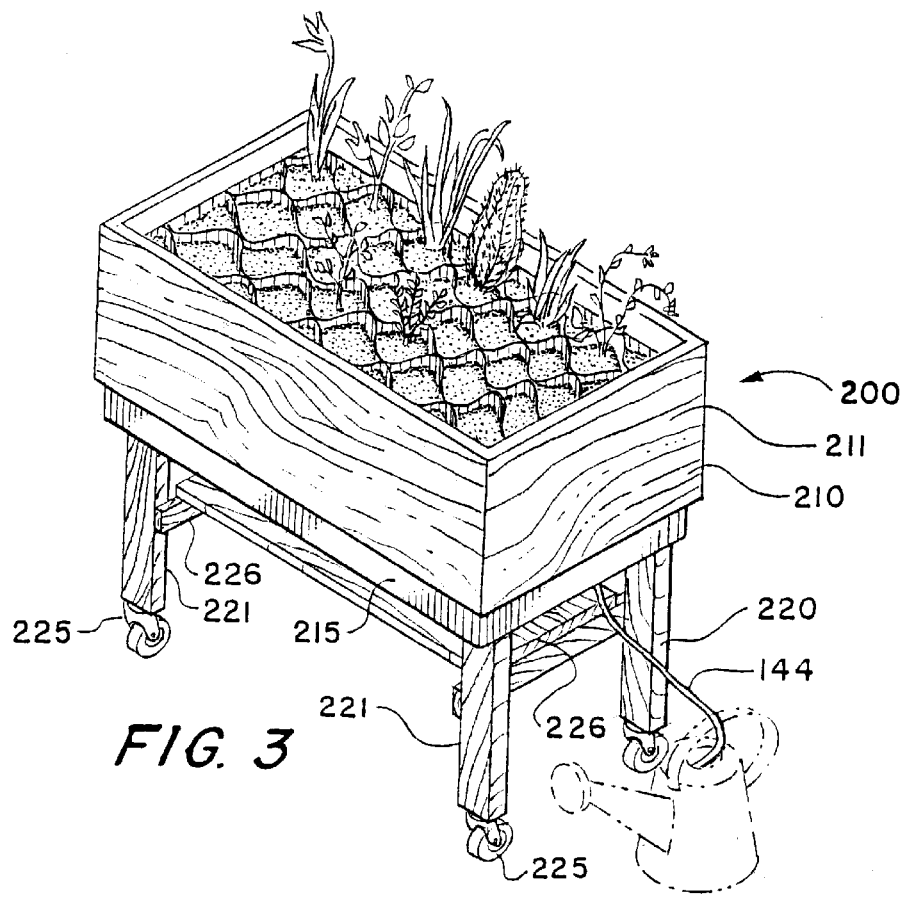
FIG. 3 is a perspective view of a portable cellular container assembly in accordance with the invention.
Figure 4:
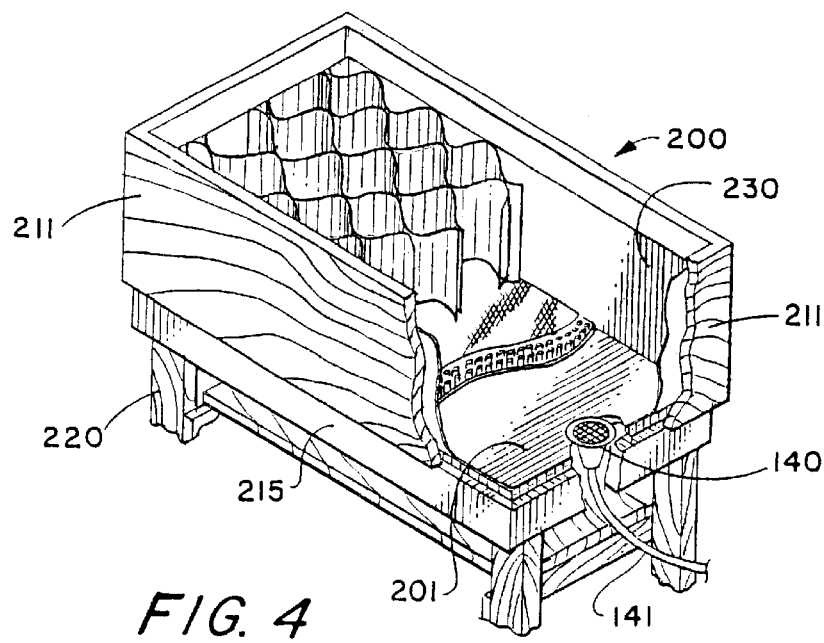
FIG. 4 is a perspective view in partial section of the portable cellular container assembly in accordance with the invention.

In another preferred embodiment shown in FIGS. 3 and 4, a portable cellular container assembly 200 is shown. A box 210 similar in structure to that shown in FIG. 2 is mounted onto a frame 220. The box 210 of this portable assembly includes a bottom support 215, because the box is lifted off of the ground. As illustrated, the frame 220 is a cart and has four legs 221 that carry the box. Each leg 221 is attached at one end to the box 210 and at the opposite end to a caster wheel 225. A shelf 226 is also depicted beneath the box and connected on its four corners to the four legs. The shelf 226 assists with the structural integrity of the cart. It also serves as a useful platform for, for instance, a bucket or watering can which allows the excess fluid from the box to drain into it so that it may be recycled. Other gardening tools may be stored there. There is also shown the drain 140 which is the single opening in the liner 201 and that allows all the excess fluids from the box 210 to empty out of the box. The drain 140 may be plugged while, for instance, the cart is stored inside a home. Alternatively, a short hose 141 may be attached to the drain so that excess fluids may feed into a bucket or watering can and be recycled.

As shown, the assembly 200 is rectangular in shape. Obviously, the assembly 200 may take other shapes. Also, the box 210 that is carried by the assembly 200 may have other desired shapes. The assembly 200, also referred to as a cart, as shown has four wheels 225. Alternatively, the cart may have only a pair of wheels at one end so that it may be moved around similarly to a wheelbarrow. Further, the cart may have only one wheel mounted to a frame thereby allowing the cart to be moved about on a single wheel. Also, the cart as shown displays a box that is integral to the frame of the cart. Alternatively, the cart may simply be a carrier for a separate and removable box or boxes structured in accordance with this invention.

Figure 5:
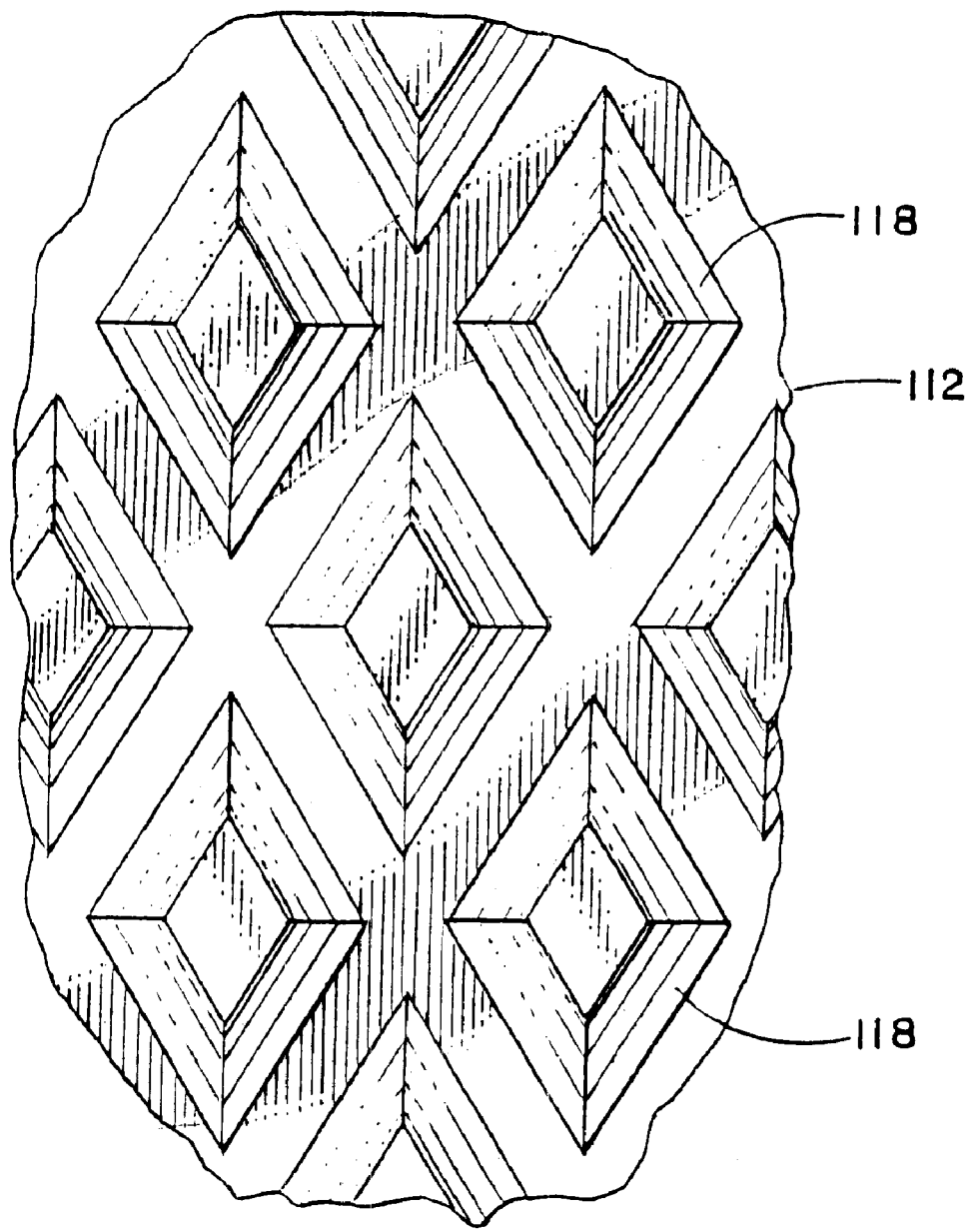
FIG. 5 is an enlarged perspective of a segment of the exterior of walls 112, illustrating diamondback protrusions thereon.
Figure 6:
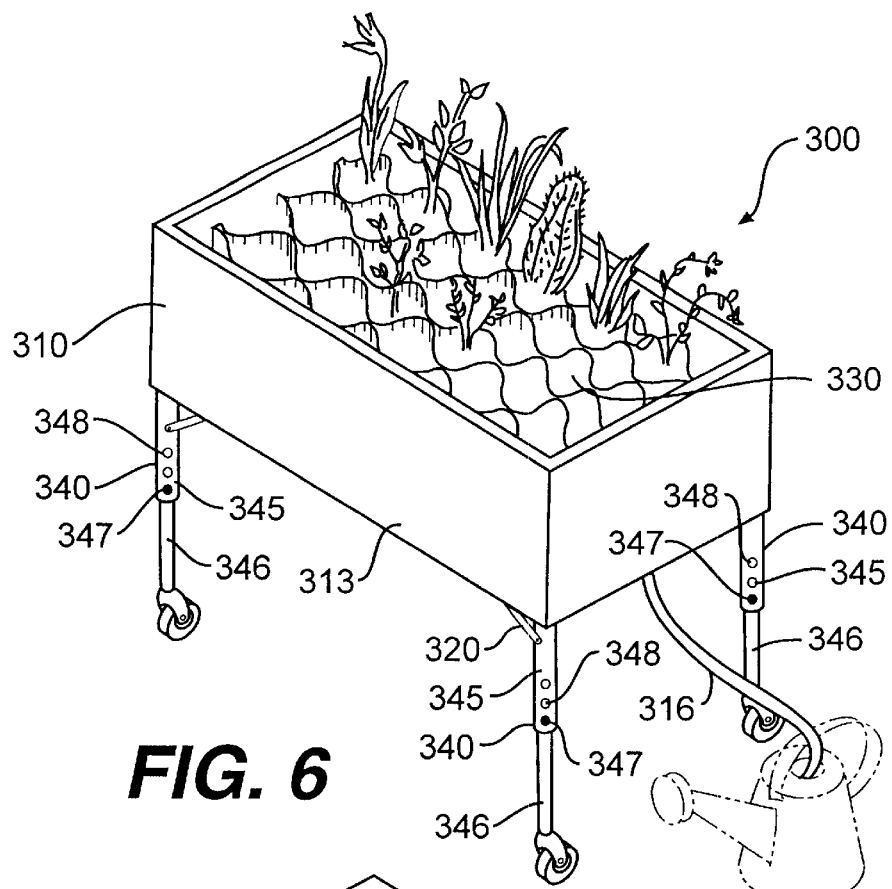
FIG. 6 is a perspective view of a portable cellular container assembly in accordance with a further embodiment of the invention.
Figure 7:
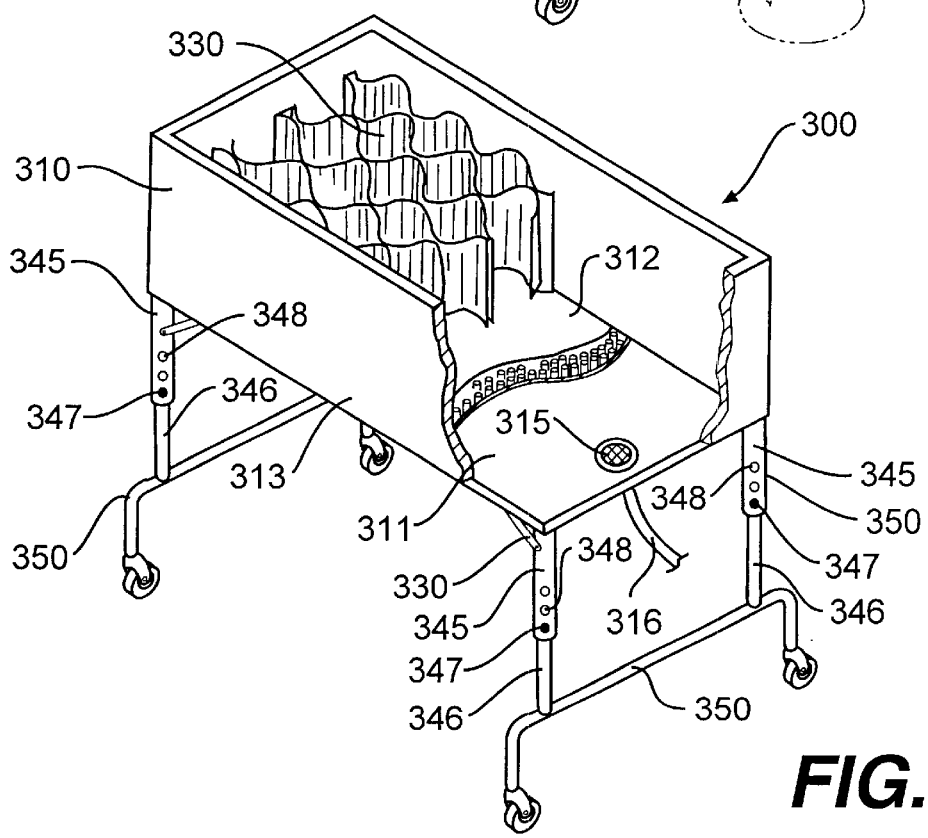
FIG. 7 is a perspective view in partial section of a portable cellular container assembly in accordance with a still further embodiment of the invention.

FIGS. 5, 6 and 7 illustrate a further alternative embodiment of the invention, and specifically illustrate an alternative portable cellular container assembly 300. This alternative assembly 300 is similar in many respects to the assembly 200 shown in FIGS. 3 and 4. The primary differences are the comparable leg structures 340 and 350 and the fact that the container assembly 300 does not include a liner.

Specifically, the portable container assembly 300 includes a box 310 mounted onto a frame 320. Inside the box 310, and resting on the bottom 311 of the box, there is a drain board 312. The drain board 312 is the same as described in detail earlier herein and as illustrated in FIGS. 1, 2 and 4. The bottom 311 of the box 310 also has a drain 315 which is the only opening in the box and that allows all excess fluids that seep through the drain board 312 to empty out of the box. As noted earlier, the drain 315 may be plugged or closed if desired. Alternatively, a short hose 316 may be attached to the drain 315 so that excess fluids may feed into a water bucket and be recycled.

The box 310 is watertight. This feature obviates the need for a liner as in the embodiments discussed earlier herein. In a preferred embodiment, the box 310 is fabricated of quarter-inch HDPE. The sides 313 and bottom 311 of the box 310 are formed together or bonded together with a suitable, waterproof adhesive to make the box watertight. In this preferred embodiment, the dimensions of the box are 24 inches x 31 inches x 8 inches deep. Obviously, the dimensions may vary accordingly to the preferences and requirements of users and manufacturers. As the size of the box varies, the thickness and width of the walls of the box will likewise vary.

A cellular confinement structure 330 is mounted on the drain board 312 and inside the box 310. Details and variations with respect to the cellular confinement structure 330 are as discussed earlier herein.

The box 310 shown on container assembly 300 may be used with a support assembly or cart like the one shown in FIGS. 3 and 4. Alternatively, there are shown different, alternative types of support legs 340 (FIG. 6) and 350 (FIG.7) that make up a cart. Wheels 341 are attached at the bottom of the legs 340 to make the assembly 300 easy to move about. The legs 340 are attached on the opposite end to the box 310. Brackets 342 are used to make the assembly 300 relatively sturdy. The brackets 342 are attached on one end to the legs 340 and on the other end to the box 310. The legs 340 may be folded under the box 310 like conventional folding table legs that are known in the industry.

The legs 340 and 350 are also shown as being two telescoping pieces, a top piece 345 and a bottom piece 346. The top piece 345 is hollow and adapted to receive the bottom piece 346. In other words, the pieces 345 and 346 slide inwardly and outwardly in a telescoping fashion, thereby varying the height of the box 310 off of the ground. The top piece 345 has holes 348 in it adapted to receive the bottom spring lock mechanism 347 that is a part of the bottom piece 346. By depressing the bottom of the spring lock mechanism 347, the legs 340 and 350 may be lengthened or shortened. In this way, the height of the box 310 is variable to the preference of the user. A child or a person in a wheelchair may adjust the leg length so that the box is easily accessible. The leg lengths may also be different to accommodate steps or an uneven surface. In a preferred embodiment, a variability in height of approximately 6 to 8 inches is found to be very helpful.

Whereas the present cellular confinement assemblage for plant propagation has been defined with reference to specifically configured elements, the scope of invention is determined with reference to the ensuing claims.

That which is claimed is:

1. A portable cellular container assembly for plant propagation comprising:
   a. collapsible linked two-layer, open ended structure containers formed of opposed container walls, said container walls being bonded by weldment at opposed contacting wall portions to form multiple containers for retention of a soil mix and an associated plant;
   b. a permeable soil drain board, upon which the containers are supported, said drain board defining a fluid permeable mat having pylons and a foraminous screen resting upon said mat;
   c. a watertight box in which the drain board is placed so that the box board confines the containers and drain board;
   d. a drain in the box to recycle fluid runoff; and
   e. a cart comprising the box, a frame for supporting the box, and a wheel attached to the frame and adapted to carry the weight of the assembly.

2. The portable cellular container assembly for plant propagation of claim 1 wherein walls of respective structure containers are embossed, at least externally, with positive, three-dimensional protrusions which form a textured finish.

3. The portable cellular container assembly for plant propagation of claim 2 wherein protrusions of walls of respective structure containers are of diamondback configuration.

4. The portable cellular container assembly for plan propagation of claim 3 wherein protrusions and indentations are embossed upon opposed faces of respective walls, the positive and negative patterns of which are the mirror image configuration of each other.

5. The portable cellular container assembly of claim 1 wherein the box is rectangular in shape and the frame comprises four legs that are each attached on one end to the box and on their other end to a wheel.

6. The portable cellular container assembly of claim 5 wherein the legs are telescoping legs whereby the height of the box can be adjusted.

7. The portable cellular container assembly of claim 1, wherein the frame comprises a telescoping leg whereby the height of the box can be adjusted.

8. A portable cellular container assembly for plant propagation comprising:

a. multiple containers for retention of a soil mix and an associated plant;

b. a permeable soil drain board, upon which the containers are supported, said drain board defining a fluid permeable mat having pylons and a foraminous screen resting upon said mat;

c. a watertight box in which the drain board is placed so that the box board confines the containers and drain board;

d. a drain in the box to recycle fluid runoff; and e. a cart comprising the box, a frame for supporting the box, and a wheel attached to the frame and adapted to carry the weight of the assembly.

\* \* \* \* \*